United States Patent
Takezawa

(10) Patent No.: US 8,042,953 B2
(45) Date of Patent: Oct. 25, 2011

(54) PROJECTOR USING BALLAST CONTROLLED HIGH-PRESSURE DISCHARGE LAMPS

(75) Inventor: Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 341 days.

(21) Appl. No.: 12/390,787

(22) Filed: Feb. 23, 2009

(65) Prior Publication Data

US 2009/0213336 A1    Aug. 27, 2009

(30) Foreign Application Priority Data

Feb. 25, 2008   (JP) ................................ 2008-042524

(51) Int. Cl.
     *G03B 21/20*    (2006.01)
(52) U.S. Cl. ........................................................ 353/85
(58) Field of Classification Search .................. 313/113; 315/144, 225, 291, 307; 353/30, 38, 85, 353/86, 94
See application file for complete search history.

(56) References Cited

U.S. PATENT DOCUMENTS

| | | | | |
|---|---|---|---|---|
| 3,725,730 A | * | 4/1973 | Nakai et al. | 315/144 |
| 4,138,621 A | * | 2/1979 | Downing et al. | 313/113 |
| 5,463,287 A | * | 10/1995 | Kurihara et al. | 315/307 |
| 6,717,375 B2 | * | 4/2004 | Noguchi et al. | 315/291 |
| 6,992,718 B1 | | 1/2006 | Takahara | |
| 7,208,882 B2 | * | 4/2007 | Ishizuka | 315/225 |
| 2005/0024602 A1 | * | 2/2005 | Shimaoka et al. | 353/94 |
| 2006/0012316 A1 | | 1/2006 | Hirata et al. | |

FOREIGN PATENT DOCUMENTS

| | | | |
|---|---|---|---|
| JP | A-08-36180 | * | 2/1996 |
| JP | A-2000-194067 | | 7/2000 |
| JP | A-2001-359025 | * | 12/2001 |

OTHER PUBLICATIONS

Jul. 12, 2010 European Search Report issued in Application No. EP 09 15 3414.

* cited by examiner

*Primary Examiner* — Georgia Y Epps
*Assistant Examiner* — Renee Naphas
(74) *Attorney, Agent, or Firm* — Oliff & Berridge, PLC

(57) ABSTRACT

A projector includes: plural high-pressure discharge lamps; a high-pressure discharge lamp lighting device for lighting the plural high-pressure discharge lamps; a light combining system that combines and outputs lights from the plural high-pressure discharge lamps; an electro-optical modulation device that modulates the light from the light combining system according to image information; and a projection system that projects the light modulated by the electro-optical modulation device, wherein the high-pressure discharge lamp lighting device supplies alternating lamp currents having alternating-current waveforms with the same waveform and period and phases shifted by a predetermined amount with respect to each of the high-pressure discharge lamps to the respective plural high-pressure discharge lamps.

7 Claims, 9 Drawing Sheets

CURRENT VALUE

BRIGHTNESS

PROJECTOR USING BALLAST CONTROLLED HIGH-PRESSURE DISCHARGE LAMPS

This application claims priority to Japanese Patent Application No. 2008-042524 filed in Japan on Feb. 25, 2008, the entire disclosure of which is hereby incorporated by reference in its entirety.

BACKGROUND

1. Technical Field

The present invention relates to a projector.

2. Related Art

High brightness projectors have been desired and projectors including plural light source lamps (so-called multi-lamp projectors) have been proposed in response to the request (for example, see JP-A-8-36180). As the light source lamp, a light source lamp having a high-pressure discharge lamp is used. Further, as an electro-optical modulation device that modulates light from the light source lamp according to image information, a liquid crystal modulation device having a liquid crystal panel is used.

According to the multi-lamp projector in the related art, the projector includes plural light source lamps, and has brightness than that of earlier one.

However, in the multi-lamp projector in the related art, there is a problem of scroll noise generation on the projection screen.

SUMMARY

An advantage of some aspects of the invention is to provide a projector having plural high-pressure discharge lamps and capable of suppressing scroll noise generation on the projection screen.

The inventors have been dedicated to studies for seeking the cause of scroll noise generation on the projection screen and found that the cause is the interference between brightness variations when the high-pressure discharge lamps are lighted using alternating current and brightness variations when the liquid crystal panel is driven.

Accordingly, the inventors have made further studies based on the above finding while focusing on the high-pressure discharge lamp lighting device for lighting plural high-pressure discharge lamps, and found that the interference between brightness variations when the high-pressure discharge lamps are lighted using alternating current and brightness variations when the liquid crystal panel is driven can be suppressed using a high-pressure discharge lamp lighting device that supplies to the respective plural high-pressure discharge lamps alternating lamp currents having alternating current waveforms with the same waveform and period and phases shifted by a predetermined amount with respect to each high-pressure discharge lamp and, as a result, the scroll noise generation on the projection screen can be suppressed, and thus, the invention has been completed.

A projector according to an aspect of the invention includes plural high-pressure discharge lamps; a high-pressure discharge lamp lighting device for lighting the plural high-pressure discharge lamps; a light combining system that combines and outputs lights from the plural high-pressure discharge lamps; an electro-optical modulation device that modulates the light from the light combining system according to image information; and a projection system that projects the light modulated by the electro-optical modulation device, wherein the high-pressure discharge lamp lighting device supplies to the respective plural high-pressure discharge lamps alternating lamp currents having alternating-current waveforms with the same waveform and period and phases shifted by a predetermined amount with respect to each of the high-pressure discharge lamps.

Therefore, according to the projector, since the high-pressure discharge lamp lighting device that supplies the alternating lamp currents having the alternating-current waveforms is provided, as known from FIG. 5B, which will be described later, the range of brightness variations in the illumination luminous flux output from the light combining system can be made relatively narrow. That is, the range of brightness variations in the illumination luminous flux output from the light combining system can be made narrower than that of the projector in the related art. As a result, the interference between brightness variations when the high-pressure discharge lamps are lighted using alternating current and brightness variations when the liquid crystal panel is driven can be suppressed, and consequently, the scroll noise generation on the projection screen can be suppressed.

In the projector, it is preferable that, given that the amount of phase shift is X (unit: period) and the number of the high-pressure discharge lamps is n (unit: number), "$X=\frac{1}{2}n$" is satisfied.

Regarding the amount of phase shift with respect to each of the plural high-pressure discharge lamps, since the reversal of polarity of each high-pressure discharge lamp occurs in a half period, if the amount may be set to a value obtained by dividing the reversal period of polarity by the number of high-pressure discharge lamps, i.e., satisfying the above equation, the range of brightness variations in the illumination luminous flux output from the light combining system can be made narrower, and consequently, the scroll noise generation on the projection screen can reliably be suppressed.

In the projector, it is preferable that the high-pressure discharge lamp lighting device has: plural ballasts provided correspondingly to the plural high-pressure discharge lamps; and a control circuit that integrated-controls the plural ballasts to supply alternating lamp currents having the alternating-current waveforms to the respective plural high-pressure discharge lamps.

According to the configuration, the alternating lamp currents having alternating-current waveforms with the same waveform and period and phases shifted by a predetermined amount with respect to each of the high-pressure discharge lamps can be supplied to the respective plural high-pressure discharge lamps by the operation of the control circuit.

In the projector, it is preferable that the high-pressure discharge lamp lighting device has a function of detecting rises of the alternating lamp currents and controlling the plural ballasts based on detection information on the rises of the alternating lamp currents.

According to the configuration, the plural ballasts can be controlled with correct timing.

In the projector, it is preferable that the high-pressure discharge lamp lighting device has: plural ballasts provided correspondingly to the plural high-pressure discharge lamps; and plural control circuits that are provided respectively correspondingly to the plural ballasts and respectively integrated-control the ballasts to supply alternating lamp currents having the alternating-current waveforms to the respective plural high-pressure discharge lamps, one control circuit of the plural control circuits has a function of outputting control information on the ballast controlled by the control circuit itself to the other control circuit, and the other control circuit has a function of controlling the corresponding ballast based on the control information from the one control circuit.

According to the configuration, the alternating lamp currents having alternating-current waveforms with the same waveform and period and phases shifted by a predetermined amount with respect to each of the high-pressure discharge lamps can be supplied to the respective plural high-pressure discharge lamps by the operation of the respective control circuits. Further, if the one control circuit is considered as a basic control circuit, the other control circuit controls the corresponding ballast based on the control information of the basic control circuit, and the ballasts can be controlled with correct timing also in this case.

In the projector, it is preferable that the alternating-current waveform is a waveform in which an instantaneous value of current gradually increases with time in a half period.

Meanwhile, when the high-pressure discharge lamp is lighted with alternating lamp current, there is a problem that the generation point of discharge arc on the electrode becomes unstable depending on the electrode temperature and the state of electrode surface of the high-pressure discharge lamp, and a phenomenon that the starting point of the discharge arc on the electrode jumps from one spot on the electrode surface to another occurs. When the phenomenon occurs, flicker occurs in the high-pressure discharge lamp.

For the problem, according to the projector, since the alternating-current waveforms are the above described waveforms, the alternating-current power supplied to the high-pressure discharge lamps becomes the maximum when the respective half periods end and the temperatures of the electrodes of the high-pressure discharge lamps rise to the higher values when the respective half periods end. Thereby, the discharge arc becomes stable and the flicker generation can be suppressed.

In the projector, it is preferable that the alternating-current waveform is a waveform in which a current pulse higher than a current value immediately before reversal of polarity is superimposed on the alternating lamp current immediately before the reversal of polarity.

According to the configuration, the temperatures of the electrodes of the high-pressure discharge lamps also rise to the higher values when the respective half periods end and the discharge arc becomes stable, and consequently, the flicker generation can be suppressed.

BRIEF DESCRIPTION OF THE DRAWINGS

The invention will be described with reference to the accompanying drawings, wherein like numbers reference like elements.

DETAILED DESCRIPTION OF EMBODIMENTS

Figure 1A:
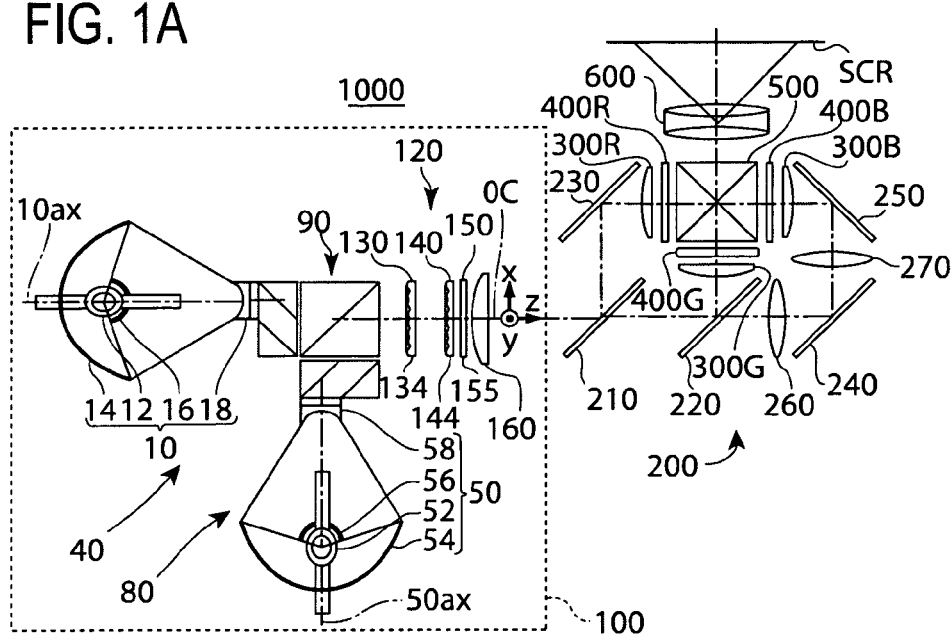
FIGS. 1A to 1C show an optical system of a projector 1000 according to embodiment 1.

Hereinafter, a projector of the invention will be described according to embodiments shown in the drawings.

Embodiment 1

First, an optical system of a projector according to embodiment 1 will be described using FIGS. 1A to 1C, 2, and 3.

Figure 1B:
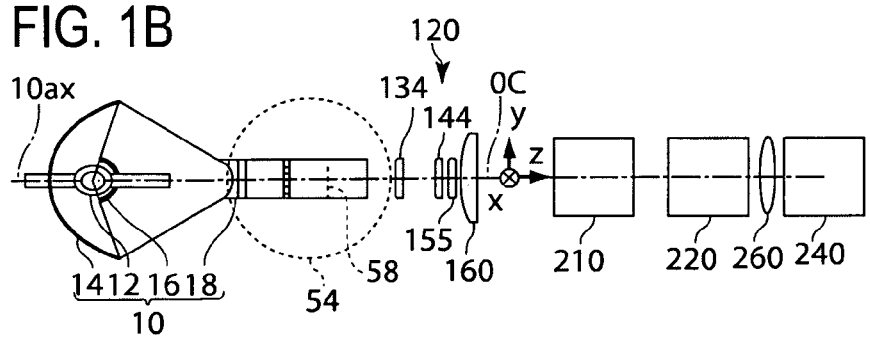
Figure 1C:
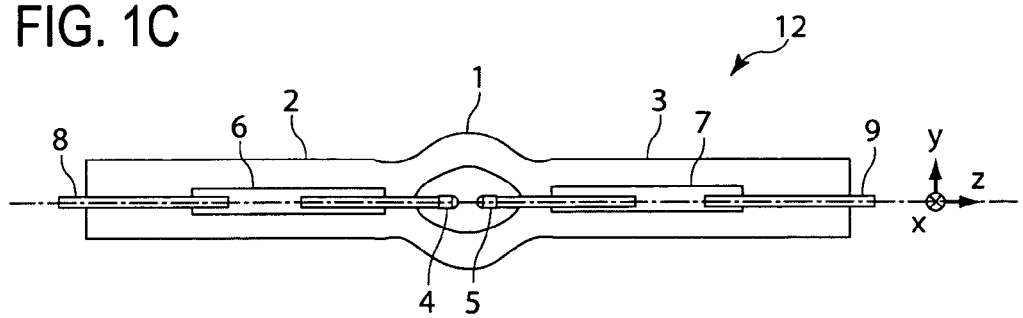
Figure 2:
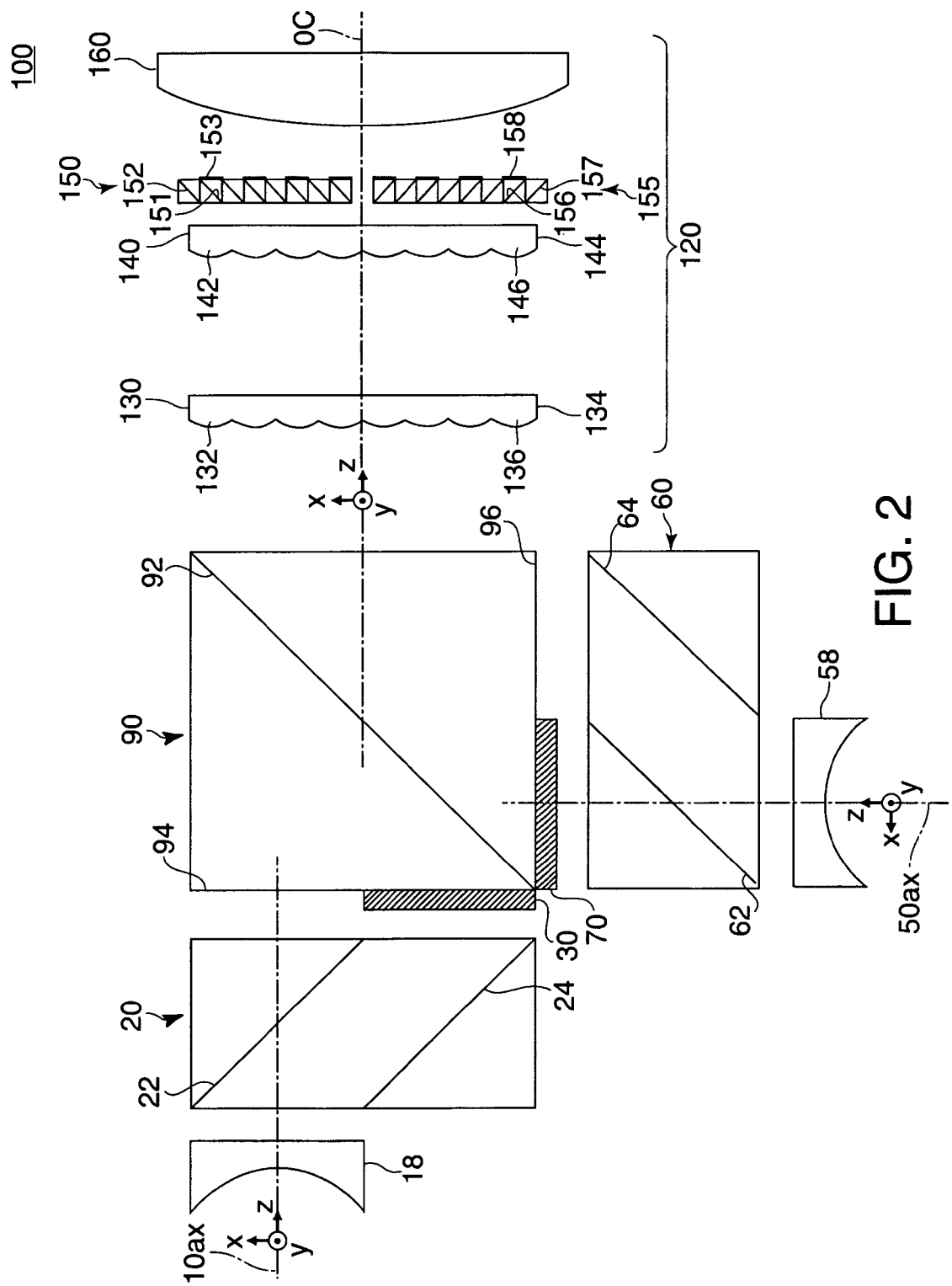
FIG. 2 is a diagram for explanation of an illumination device 100.
Figure 3:
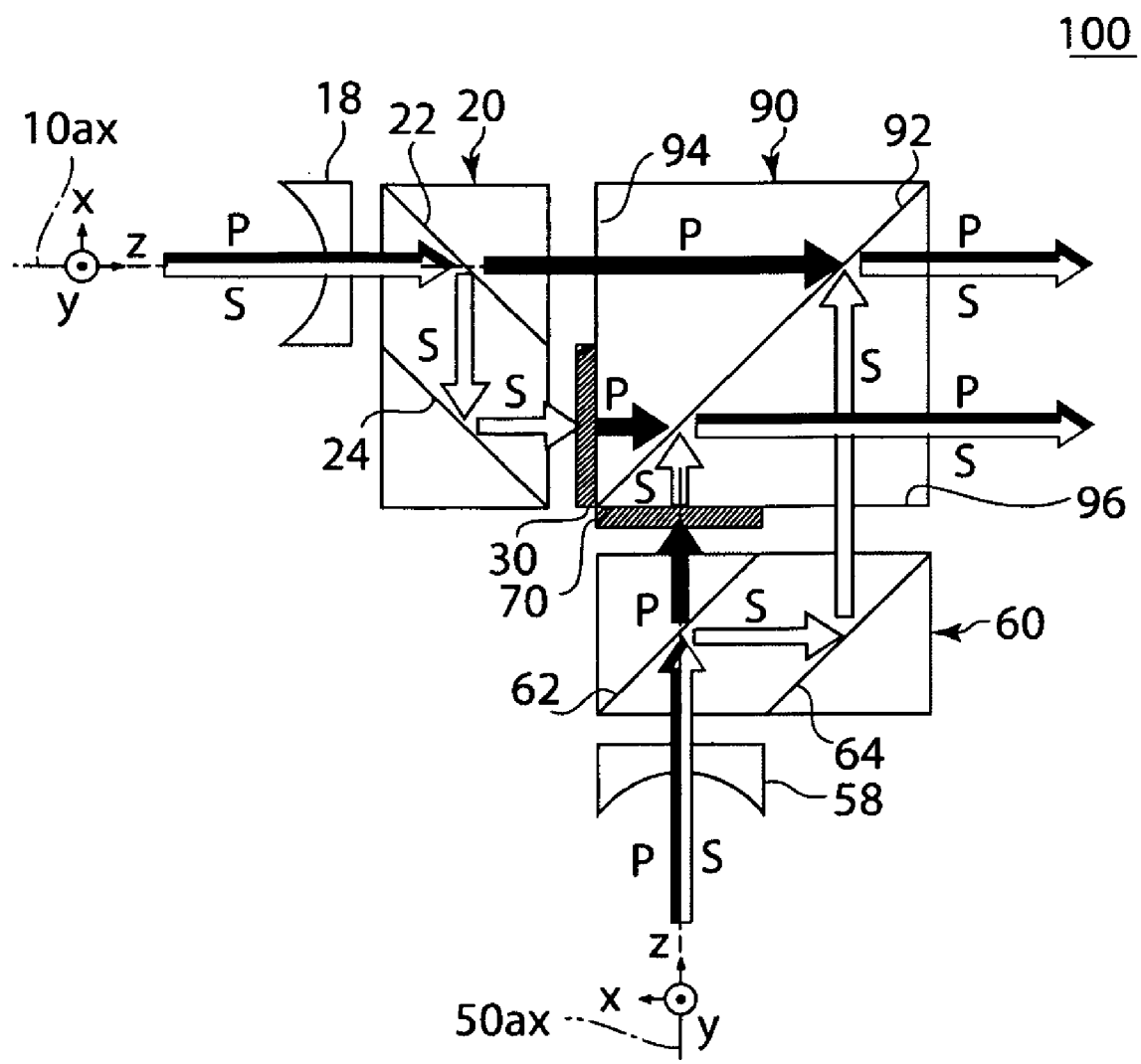
FIG. 3 schematically shows that illumination luminous fluxes output from two light sources 10, 50 are polarization-separated and combined.

FIGS. 1A to 1C show the optical system of the projector 1000 according to embodiment 1, FIG. 1A is a plan view showing the optical system of the projector 1000, FIG. 1B is a side view showing the optical system of the projector 1000, and FIG. 1C is a diagram for explanation of a high-pressure discharge lamp 12. FIG. 2 is a diagram for explanation of an illumination device 100. FIG. 3 schematically shows that illumination luminous fluxes output from two light sources 10, 50 are polarization-separated and combined.

In the description as below, three directions orthogonal to one another are the z-axis direction (the direction of the system optical axis OC in FIG. 1A), the x-axis direction (the direction in parallel to the paper surface and orthogonal to the z-axis direction in FIG. 1A), and the y-axis direction (the direction perpendicular to the paper surface and orthogonal to the z-axis direction in FIG. 1A).

Figure 4:
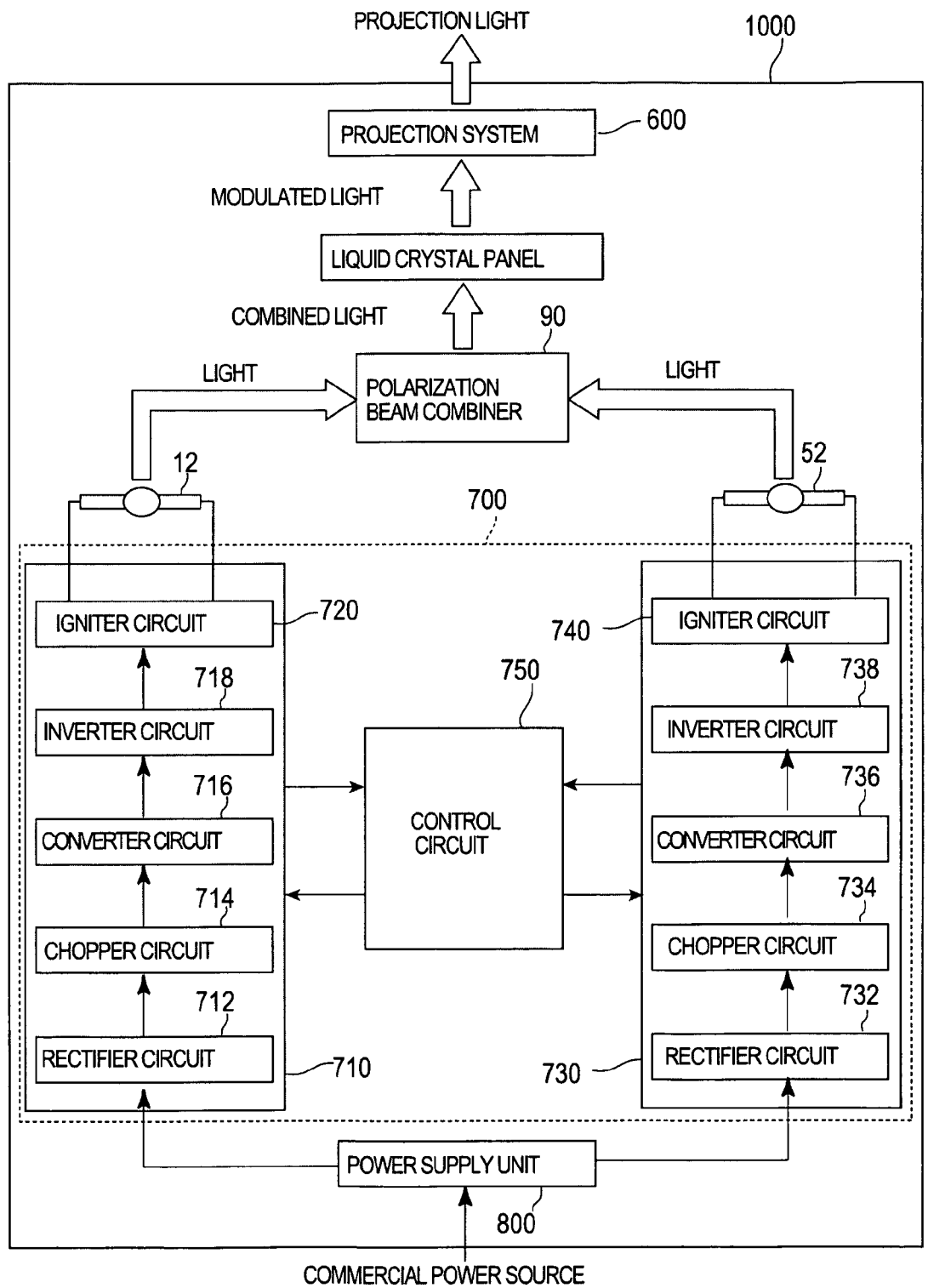
FIG. 4 is a block diagram for explanation of a circuit configuration of a high-pressure discharge lamp lighting device 700.

As shown in FIG. 1A, the projector 1000 according to embodiment 1 is a so-called two-lamp projector including the illumination device 100, a color separation and guiding system 200 that separates an illumination flux from the illumination device 100 into three color lights and guiding the lights to an illuminated area, three liquid crystal modulation units 400R, 400G, 400B as an electro-optical modulation unit that modulates the respective three color lights separated by the color separation and guide system 200 according to image information, a cross dichroic prism 500 as a color combining system that combines the color lights modulated by the liquid crystal modulation units 400R, 400G, 400B, a projection system 600 that projects the light combined by the cross dichroic prism 500 onto a projection surface such as a screen SCR, a high-pressure discharge lamp lighting device 700, a power supply unit 800 connected to an external commercial power source (regarding the high-pressure discharge lamp lighting device 700 and the power supply unit 800, see FIG. 4 described as below).

As shown in FIGS. 1A to 1C and 2, the illumination device 100 includes two polarization light sources 40, 80, a polarization beam combiner 90 as a light combining system that combines and outputs the illumination luminous fluxes output from the polarization light sources 40, 80, and an integrator system 120 having a function of converting the illumination luminous flux from the polarization beam combiner 90 into light having a homogeneous intensity distribution.

As shown in FIGS. 1A to 1C, 2, and 3, the polarization light source 40 has the light source 10 that outputs a nearly parallel illumination luminous flux, a polarization separation optical element 20 that separates the illumination luminous flux from the light source 10 into an illumination luminous flux of P-polarized component and an illumination luminous flux of S-polarized component, and a ½ plate 30 that is provided in a location where the illumination luminous flux of S-polarized component output from the polarization separation optical element 20 passes.

The light source 10 has the high-pressure discharge lamp 12, an ellipsoidal reflector 14 that reflects the lights radiated from the high-pressure discharge lamp 12 toward the secondary focal position, a secondary mirror 16 that is provided facing the ellipsoidal reflector 14 with a tube part 1 of the high-pressure discharge lamp 12 in between and reflects the lights that do not travel to the ellipsoidal reflector 14 of the lights radiated from the high-pressure discharge lamp 12 toward the high-pressure discharge lamp 12, and a concave lens 18 that outputs the converging light from the ellipsoidal reflector 14 toward a position corresponding to a polarization separation surface 22 on the light-incident surface of the polarization separation optical element 20. The light source 10 outputs a luminous flux centered around an optical axis 10ax.

The high-pressure discharge lamp 12 has the tube part 1 containing a pair of electrodes 4, 5 provided along the optical axis 10ax, a pair of sealing parts 2, 3 extending from both sides of the tube part 1, a pair of metal foils 6, 7 sealed within the pair of sealing parts 2, 3, respectively, and a pair of leads 8, 9 electrically connected to the pair of metal foils 6, 7, respectively, and the lamp is provided so that the light emission center is located near the primary focal point of the ellipsoidal reflector 14. When a voltage is applied to the leads 8, 9, a potential difference is generated between the electrodes 4, 5 and an arc image is generated.

Exemplary conditions of the component elements of the high-pressure discharge lamp 12 are as follows. The tube part 1 and the sealing parts 2, 3 are made of silica glass, for example, and mercury, rare gas, and a small amount of halogen are sealed within the tube part 1. The electrodes 4, 5 are tungsten electrodes, for example, and the metal foils 6, 7 are molybdenum foils, for example. The leads 8, 9 contain molybdenum or tungsten, for example.

As the high-pressure discharge lamp 12, various discharge lamps that emit light with high brightness may be adopted, and, for example, a high-pressure mercury lamp, an ultra-high-pressure mercury lamp, a metal halide lamp, or the like may be adopted.

As shown in FIGS. 2 and 3, the polarization separation optical element 20 has the polarization separation surface 22 that, of the illumination luminous fluxes from the light source 10, transmits the illumination luminous flux of P-polarized component and reflects the illumination luminous flux of S-polarized component away from the optical axis 10ax of the light source 10, and a reflection surface 24 that reflects the illumination luminous flux of S-polarized component reflected by the polarization separation surface 22 toward the direction in parallel to the illumination luminous flux of P-polarized component transmitted through the polarization separation surface 22.

The ½ plate 30 is provided in a predetermined location on a light-incident surface 94 of the polarization beam combiner 90 (a location where the illumination luminous flux of S-polarized component output from the polarization separation optical element 20 passes), which will be described later. The plate converts the illumination luminous flux of S-polarized component into an illumination luminous flux of P-polarized component.

The polarization light source 40 has the above described configuration, and thus, can output the illumination luminous fluxes from the light source 10 as the illumination luminous fluxes of P-polarized component.

Regarding the polarization separation optical element 20, the polarization separation surface 22 that transmits the illumination luminous flux of P-polarized component and reflects the illumination luminous flux of S-polarized component may be replaced by another polarization separation surface that transmits the illumination luminous flux of S-polarized component and reflects the illumination luminous flux of P-polarized component. In this case, the ½ plate 30 is provided in a location where the illumination luminous flux of S-polarized component that has been transmitted through the other polarization separation surface passes. In this manner, if the polarization separation optical element including the other polarization separation surface is used, the polarization light source 40 can output the illumination luminous fluxes from the light source 10 as the illumination luminous fluxes of P-polarized component.

As shown in FIGS. 1A to 1C, 2, and 3, the polarization light source 80 has the light source 50 that outputs a nearly parallel illumination luminous flux, a polarization separation optical element 60 that separates the illumination luminous flux from the light source 50 into an illumination luminous flux of P-polarized component and an illumination luminous flux of S-polarized component, and a ½ plate 70 that is provided in a location where the illumination luminous flux of P-polarized component output from the polarization separation optical element 60 passes.

The light source 50 has a high-pressure discharge lamp 52, an ellipsoidal reflector 54 that reflects the lights radiated from the high-pressure discharge lamp 52 toward the secondary focal position, a secondary mirror 56 that is provided facing the ellipsoidal reflector 54 with a tube part of the high-pressure discharge lamp 52 in between and reflects the lights that do not travel to the ellipsoidal reflector 54 of the lights radiated from the high-pressure discharge lamp 52 toward the high-pressure discharge lamp 52, and a concave lens 58 that outputs the converging light from the ellipsoidal reflector 54 toward a position corresponding to a polarization separation surface 62 on the light-incident surface of the polarization separation optical element 60. The light source 50 outputs a luminous flux centered around an optical axis 50ax. The high-pressure discharge lamp 52 has the same configuration as that of the high-pressure discharge lamp 12, and the detailed description will be omitted.

As shown in FIGS. 2 and 3, the polarization separation optical element 60 has a polarization separation surface 62 that, of the illumination luminous fluxes from the light source 50, transmits the illumination luminous flux of P-polarized component and reflects the illumination luminous flux of S-polarized component away from the optical axis 50ax of the light source 50, and a reflection surface 64 that reflects the illumination luminous flux of S-polarized component reflected by the polarization separation surface 62 toward the direction in parallel to the illumination luminous flux of P-polarized component transmitted through the polarization separation surface 62.

The ½ plate 70 is provided in a predetermined location on a light-incident surface 96 of the polarization beam combiner 90 (a location where the illumination luminous flux of P-polarized component output from the polarization separation optical element 60 passes), which will be described later. The plate converts the illumination luminous flux of P-polarized component into an illumination luminous flux of S-polarized component.

The polarization light source 80 has the above described configuration, and thus, can output the illumination luminous fluxes from the light source 50 as the illumination luminous fluxes of S-polarized component.

Regarding the polarization separation optical element 60, the polarization separation surface 62 that transmits the illumination luminous flux of P-polarized component and reflects the illumination luminous flux of S-polarized component may be replaced by another polarization separation surface that transmits the illumination luminous flux of S-polarized component and reflects the illumination luminous flux of P-polarized component. In this case, the ½ plate 70 is provided in a location where the illumination luminous flux of P-polarized component that has been transmitted through the other polarization separation surface passes. In this manner, if the polarization separation optical element including the other polarization separation surface is used, the polarization light source 80 can output the illumination luminous fluxes from the light source 50 as the illumination luminous fluxes of S-polarized component.

The polarization beam combiner 90 has a nearly square shape formed by bonding a triangular prism having a light-incident surface 94 and a triangular prism having the light-incident surface 96 in the plan view, and a polarization combining surface 92 that transmits the illumination luminous flux of P-polarized component and reflects the illumination luminous flux of S-polarized component is formed on the interface where the triangular prisms are bonded. The illumination luminous flux of P-polarized component output from the polarization light source 40 and entering the light-incident surface 94 is transmitted through a polarization combining surface 92. The illumination luminous flux of S-polarized component output from the polarization light source 80 and entering the light-incident surface 96 is reflected on the polarization combining surface 92. Thereby, the illumination luminous flux of P-polarized component output from the polarization light source 40 and the illumination luminous flux of S-polarized component output from the polarization light source 80 are combined and output from the polarization beam combiner 90 toward the integrator system 120.

The combination of the illumination luminous fluxes output from the polarization light sources 40, 80 in the polarization beam combiner 90 will be specifically described. As shown in FIG. 3, the polarization beam combiner 90 combines the illumination luminous flux of P-polarized component transmitted through the polarization separation surface 22 and the illumination luminous flux of S-polarized component reflected on the polarization separation surface 62. Further, the combiner combines the illumination luminous flux of P-polarized component reflected on the polarization separation surface 22 and polarization-converted by the ½ plate 30 and the illumination luminous flux of S-polarized component transmitted through the polarization separation surface 62 and polarization-converted by the ½ plate 70. Then, the combiner outputs the combined light toward the integrator system 120.

The polarization beam combiner 90 has the same configuration as that of a polarization beam splitter, but the direction in which the light passes is opposite to that in the polarization beam splitter. The combiner combines two kinds of linearly-polarized lights in the polarization directions perpendicular to each other and outputs light as apparently non-polarized light.

As shown in FIG. 2, the integrator system 120 includes two first lens arrays 130, 134 having plural first small lenses 132, 136 that split the illumination luminous flux from the polarization beam combiner 90 into plural partial luminous fluxes, respectively, two second lens arrays 140, 144 having plural second small lenses 142, 146 corresponding to the first small lenses 132, 136 of the two first lens arrays 130, 134, respectively, two polarization conversion elements 150, 155 that convert the respective partial luminous fluxes from the two second lens arrays 140, 144 into luminous fluxes having substantially one kind of linearly polarized component, and a superimposing lens 160 that superimposes the respective lights from the two polarization conversion elements 150, 155 in the illuminated area.

The polarization conversion elements 150, 155 have polarization separation surfaces 151, 156 that transmit the luminous fluxes of P-polarized component of the luminous fluxes output from the second lens arrays 140, 144 and reflects the luminous fluxes of S-polarized component away from the system optical axis OC (in the x-axis direction), reflection surfaces 152, 157 that reflect the luminous fluxes of S-polarized component reflected on the polarization separation surfaces 151, 156 in a direction in parallel to the luminous fluxes of P-polarized component transmitted through the polarization separation surfaces 151, 156 (in the z-axis direction), ½ plates 153, 158 that are provided in positions on light-exit surfaces of the polarization conversion elements 150, 155 where the luminous fluxes of P-polarized component are output and convert the luminous fluxes of P-polarized component into luminous fluxes of S-polarized component.

The superimposing lens 160 is an optical element for collecting the plural partial luminous fluxes passing through the first lens arrays 130, 134, the second lens arrays 140, 144, and the polarization conversion elements 150, 155 and superimposing them in the vicinity of the image formation area of the liquid crystal modulation units 400R, 400G, 400B. The superimposing lens 160 is provided so that the optical axis of the superimposing lens 160 and the system optical axis OC of the illumination device 100 may be nearly aligned. The superimposing lens 160 may be configured by a compound lens formed by combining plural lenses.

As shown in FIG. 2, the first lens array 130, the second lens array 140 and the polarization conversion element 150, and the first lens array 134, the second lens array 144 and the polarization conversion element 155 are disposed symmetrically with respect to a virtual surface containing the system optical axis OC (the optical axis of the superimposing lens 160).

Next, the configuration of the respective optical elements provided at the downstream of the integrator system 120 in the optical path will be described.

As shown in FIG. 1A, the color separation and guiding system 200 has a dichroic mirror 210, a dichroic mirror 220, reflection mirrors 230, 240, 250, a light incident-side lens 260, and a relay lens 270. The color separation and guiding system 200 has a function of separating the illumination luminous flux output from the superimposing lens 160 into three color lights of red light, green light, and blue light, and guiding the color lights to the three liquid crystal modulation units 400R, 400G, 400B as targets of illumination, respectively.

The dichroic mirrors 210, 220 are optical elements with substrates on which wavelength selection films that reflect luminous fluxes in predetermined wavelength ranges and transmit luminous fluxes in other wavelength ranges are formed. The diclroic mirror 210 disposed at the upstream in the optical path is a mirror that reflects the red light component and transmits the other color light components. The dichroic mirror 220 disposed at the downstream in the optical path is a mirror that reflects the green light component and transmits the blue light component.

The red light component reflected by the dichroic mirror 210 is reflected by the reflection mirror 230 and enters the image formation area of the liquid crystal panel of the liquid crystal modulation unit 400R for red light via a collecting lens 300R.

The collecting lens 300R is provided for converting the respective partial luminous fluxes from the superimposing lens 160 into luminous fluxes nearly in parallel to the respective principal rays. Collecting lenses 300G, 300B disposed at the upstream in the optical paths of the other liquid crystal modulation units 400G, 400B have the same configuration as that of the collecting lens 300R.

The green light component of the blue light component and green light component transmitted through the dichroic mirror 210 is reflected by the dichroic mirror 220, passes through the collecting lens 300G, and enters the image formation area of the liquid crystal panel of the liquid crystal modulation unit 400G for green light. On the other hand, the blue light component is transmitted through the dichroic mirror 220, passes through the light incident-side lens 260, the reflection mirror 240 at the light-incident side, the relay lens 270, the reflection mirror 250 at the light-exit side, and the collecting lens 300B, and enters the image formation area of the liquid crystal panel of the liquid crystal modulation unit 400B for blue light. The light incident-side lens 260, the relay lens 270, the reflection mirrors 240, 250 have a function of guiding the blue light component transmitted through the dichroic mirror 220 to the liquid crystal modulation unit 400B.

The light incident-side lens 260, the relay lens 270, the reflection mirrors 240, 250 are provided in the optical path of the blue light for preventing reduction in light use efficiency due to light diffusion or the like because the length of the optical path of the blue light is longer than the lengths of the optical paths of the other color lights. In the projector 1000 according to embodiment 1, the configuration is adopted because the length of the optical path of the blue light is longer, however, the configuration in which the length of the optical path of the red light is made longer and the light incident-side lens 260, the relay lens 270, the reflection mirrors 240, 250 are used for the optical path of the red light is conceivable.

The liquid crystal modulation units 400R, 400G, 400B, though the explanation by illustration of which is omitted, each has a liquid crystal panel, a light incident-side polarizer disposed at the light incident side of the liquid crystal panel, and a light exit-side polarizer disposed at the light exit side of the liquid crystal panel for transmitting light of polarization axis orthogonal to the polarization axis of the light transmitted through the light incident-side polarizer.

The liquid crystal panel modulates illumination luminous flux according to image information and is a target of illumination of the illumination device 100. The liquid crystal panel is formed by hermetically sealing crystal liquid as an electro-optical material between a pair of transparent glass substrates and, using polysilicon TFTs as switching elements, for example, modulates the polarization direction of one kind of linearly-polarized light output from the light incident-side polarizer according to given image information.

The light modulation of the respective incident color lights is performed by the light incident-side polarizer, the liquid crystal panel, and the light exit-side polarizer.

The cross dichroic prism 500 is an optical element that combines optical images modulated with respect to each color light output from the light exit-side polarizer to form a color image. The cross dichroic prism 500 has a nearly square shape formed by bonding four right angle prisms in the plan view, and dielectric multilayer films are formed on nearly X-shaped interfaces where the four right angle prisms are bonded. The dielectric multilayer film formed on one of the nearly X-shaped interfaces reflects red light and the dielectric multilayer film formed on the other interface reflects blue light The red light and blue light are bent by these dielectric multilayer films and aligned in the traveling direction of the green light, and then, three color lights are combined.

The color image output from the cross dichroic prism 500 is enlarged and projected by the projection system 600 to form a magnified image on the screen SCR.

Next, a circuit configuration of the high-pressure discharge lamp lighting device 700 will be described using FIGS. 4, 5A and 5B.

FIG. 4 is a block diagram for explanation of the circuit configuration of the high-pressure discharge lamp lighting device 700. FIGS. 5A and 5B are diagrams for explanation of the high-pressure discharge lamp lighting device 700. FIG. 5A shows alternating current waveforms, and FIG. 5B shows brightness variations in illumination luminous flux output from the polarization beam combiner 90.

The high-pressure discharge lamp lighting device 700 is a lighting unit for lighting the above described two high-pressure discharge lamps 12, 52, and, as shown in FIG. 4, is connected to the power supply unit 800 and has two ballasts 710, 730 provided correspondingly to the high-pressure discharge lamps 12, 52 and a control circuit 750 that integrated-controls the ballasts 710, 730.

The ballasts 710, 730 have rectifier circuits 712, 732 that rectify the alternating current supplied from the power supply unit 800, chopper circuits 714, 734 that convert output voltages of the rectifier circuits 712, 732 into desired direct-current voltages, converter circuits 716, 736 that switch the output power from the chopper circuits 714, 734 and convert the switching power into direct-current power and output them, inverter circuits 718, 738 that convert the direct-current power output from the converter circuits 716, 736 into alternating-current power and output them, and igniter circuits 720, 740 that apply predetermined start voltages to the high-pressure discharge lamp 12.

The control circuit 750, though the explanation by illustration of which is omitted, has at least a signal generating part that generates a predetermined command signal, a pulse width control part that provides pulse width control to the converter circuits 716, 736 based on the command signal, and a voltage and current detection circuit that detects the voltage and current at the output sides of the converter circuits 716, 736. Further, the signal generating part generates signals (triangular wave signals) for supplying alternating lamp currents with alternating-current waveforms (hereinafter, referred to as triangular waves) in which the instantaneous values of current gradually increases with time in a half period to the high-pressure discharge lamps 12, 52. The pulse width control part has a function of generating signals having pulse widths according to the triangular wave signals and supplying the signals to the converter circuits 716, 736 for controlling their switching operations.

Figure 5:
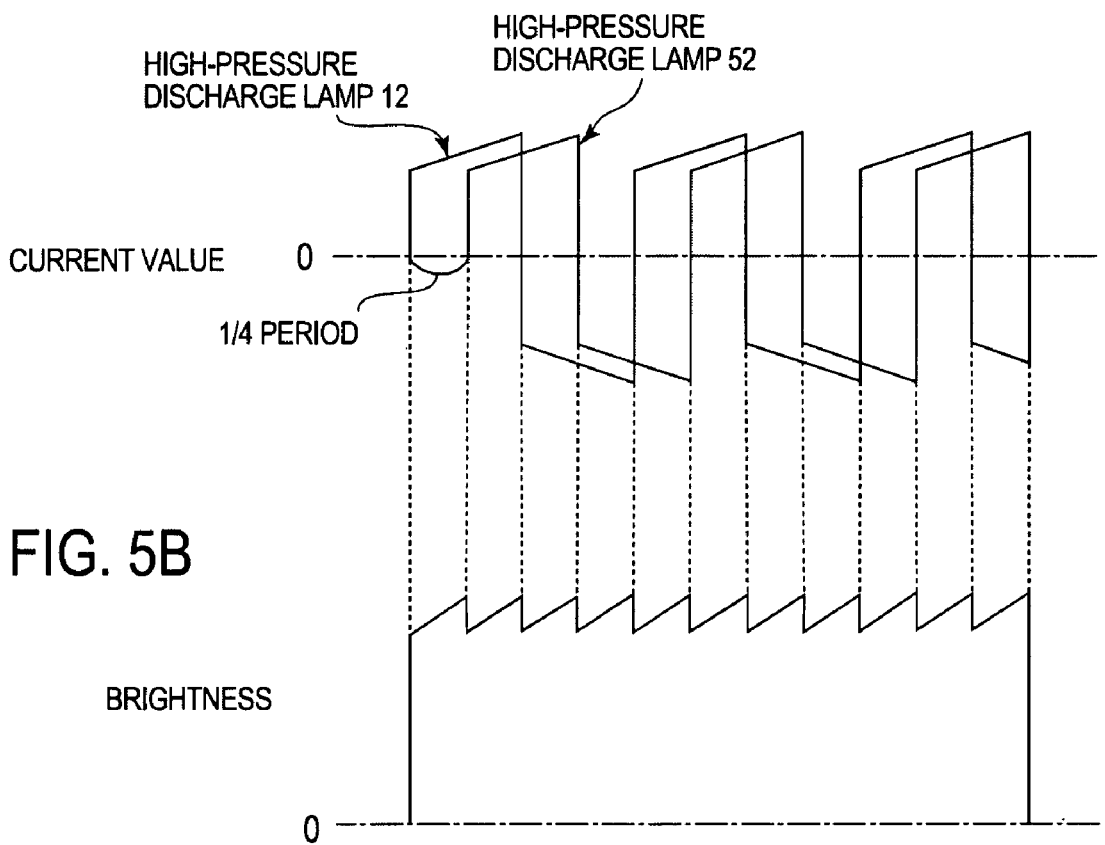
FIGS. 5A and 5B are diagrams for explanation of the high-pressure discharge lamp lighting device 700.

Further, as shown in FIG. 5A, the control circuit 750 has a function of controlling the plural ballasts 710, 730 to supply alternating lamp currents having alternating-current waveforms with the same waveform and period and phases shifted by a predetermined amount with respect to each of the high-pressure discharge lamps 12, 52 to the respective two high-pressure discharge lamps 12, 52.

Given that the amount of phase shift is X (unit: period) and the number of the high-pressure discharge lamps is n (unit: number), the configuration satisfies "X=½n". In embodiment 1, the number of the high-pressure discharge lamps is two and the amount of phase shift X is ¼ period.

Furthermore, the control circuit 750 has a function of detecting the rises of the alternating lamp currents and controlling the respective ballasts 710, 730 based on detection information on the rises of the alternating lamp currents.

The phase adjustment of the alternating lamp currents made based on these functions of the control circuit 750 will be described in detail using FIG. 6.

Figure 6:
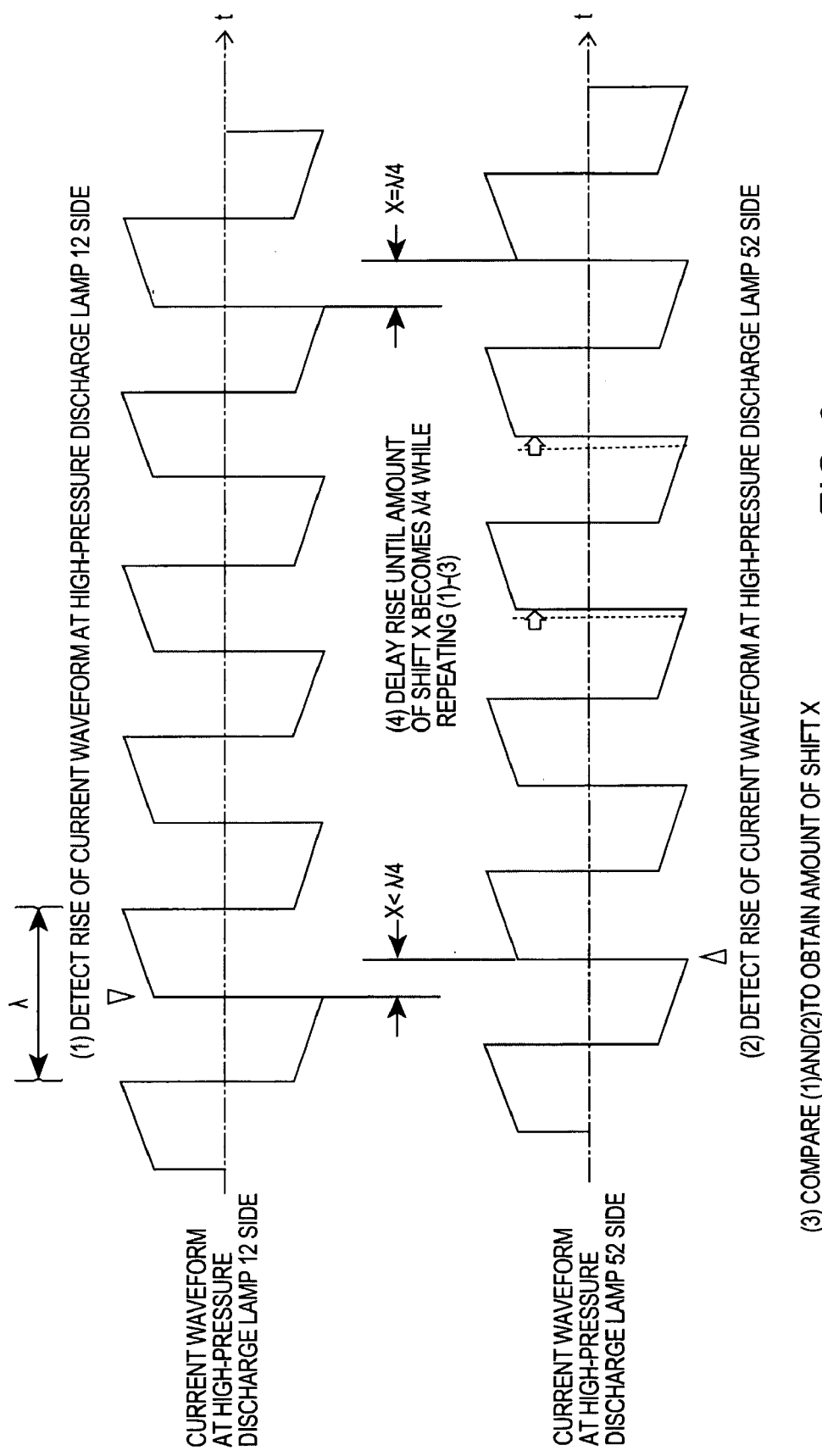
FIG. 6 is a diagram for explanation of phase adjustment of alternating lamp currents.

FIG. 6 is a diagram for explanation of the phase adjustment of the alternating lamp currents. FIG. 6 shows the case where the phase adjustment of the alternating lamp currents at the high-pressure discharge lamp 52 side is made when "the amount of phase shift $X<\frac{1}{4}$" as an example.

The control circuit 750 first detects the rise of the waveform (drive waveform) of the alternating lamp currents at the high-pressure discharge lamp 12 side and the rise of the waveform (drive waveform) of the alternating lamp currents at the high-pressure discharge lamp 52 side. Then, the circuit compares the times of rise of both waveforms and obtains the amount of phase shift X. If the amount of phase shift X is less than $\frac{1}{4}$, the rise of the waveform at the high-pressure discharge lamp 52 side is delayed. The operation is repeated until "$X=\frac{1}{4}$" is satisfied.

In FIG. 6, the rise of the waveform of the alternating lamp currents at the high-pressure discharge lamp 52 side is delayed when the amount of phase shift X is less than $\frac{1}{4}$, however, the invention is not limited thereto, but the rise of the waveform of the alternating lamp currents at the high-pressure discharge lamp 12 side may be made earlier.

Further, when the amount of phase shift X obtained by comparison between the times of rise of the waveforms is larger than $\frac{1}{4}$, for example, the rise of the waveform at the high-pressure discharge lamp 52 side may be made earlier or the rise of the waveform at the high-pressure discharge lamp 12 side may be delayed.

For further detailed description of the high-pressure discharge lamp lighting device 700, a high-pressure discharge lamp lighting device 700a in a comparative example of embodiment 1 will be described.

Figure 7:
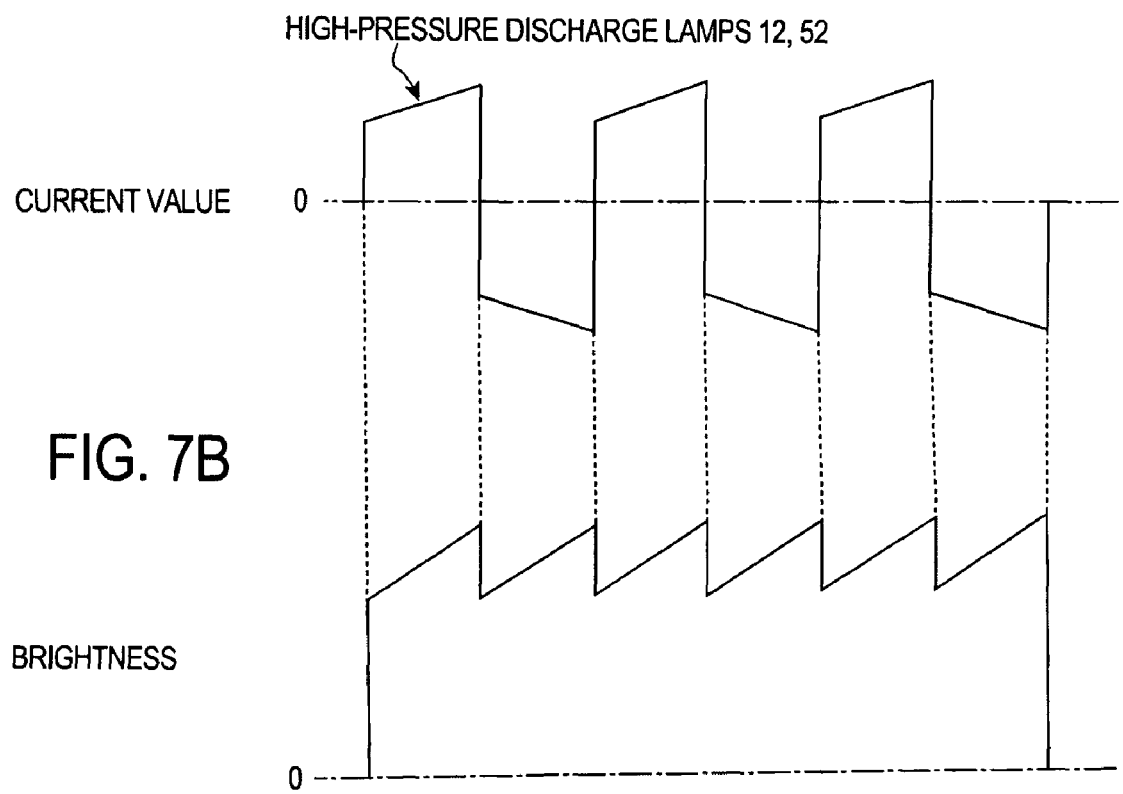
FIGS. 7A and 7B are diagrams for explanation of a high-pressure discharge lamp lighting device 700a in a comparative example.

FIGS. 7A and 7B are diagrams for explanation of the high-pressure discharge lamp lighting device 700a. FIG. 7A shows alternating current waveforms, and FIG. 7B shows brightness variations in illumination luminous flux output from the polarization beam combiner 90.

The high-pressure discharge lamp lighting device 700a in the comparative example (not shown) basically has the same configuration as that of the high-pressure discharge lamp lighting device 700 in embodiment 1, but differs in the alternating-current waveforms of the alternating lamp currents to be supplied to the high-pressure discharge lamps from the high-pressure discharge lamp lighting device 700 in embodiment 1.

That is, as shown in FIG. 7A, the alternating-current waveforms in the comparative example are identical, having the same waveform and period with no phase shift with respect to each high-pressure discharge lamp.

In this case, as shown in FIG. 7B, the range of brightness variations in the illumination luminous flux output from the polarization beam combiner 90 is relatively wide, and thereby, the scroll noise is generated on the projection screen due to the interference between brightness variations when the high-pressure discharge lamps 12, 52 are lighted using alternating current and brightness variations when the liquid crystal panel is driven.

On the other hand, according to the projector 1000 of embodiment 1, since the high-pressure discharge lamp lighting device 700 that supplies the alternating lamp currents having the alternating-current waveforms shown in FIG. 5A, as known from FIG. 5B, the range of brightness variations in the illumination luminous flux output from the polarization beam combiner 90 can be made relatively narrow. That is, the range of brightness variations in the illumination luminous flux output from the polarization beam combiner 90 can be made narrower than that of the comparative example. As a result, the interference between brightness variations when the high-pressure discharge lamps 12, 52 are lighted using alternating current and brightness variations when the liquid crystal panel is driven can be suppressed, and consequently, the scroll noise generation on the projection screen can be suppressed.

In the projector 1000 of embodiment 1, given that the amount of phase shift is X (unit: period) and the number of the high-pressure discharge lamps is n (unit: number), the configuration satisfies "$X=\frac{1}{2}n$" and the range of brightness variations in the illumination luminous flux output from the polarization beam combiner 90 can be made narrow, and consequently, the scroll noise generation on the projection screen can reliably be suppressed.

In the projector 1000 of embodiment 1, the high-pressure discharge lamp lighting device 700 has ballasts 710, 730 provided correspondingly to the high-pressure discharge lamps 12, 52 and the control circuit 750 that integrated-controls the ballasts 710, 730 to supply alternating lamp currents having the alternating-current waveforms to the respective two high-pressure discharge lamps 12, 52. Thereby, according to the operation of the control circuit 750, the alternating lamp currents having alternating-current waveforms with the same waveform and period and phases shifted by a predetermined amount with respect to each of the high-pressure discharge lamps can be supplied to the respective high-pressure discharge lamps 12, 52.

In the projector 1000 of embodiment 1, since the high-pressure discharge lamp lighting device 700 (control circuit 750) has the function of detecting the rises of the alternating lamp currents and controlling the respective ballasts 710, 730 based on detection information on the rises of the alternating lamp currents, the ballasts 710, 730 can be controlled with correct timing.

In the projector 1000 of embodiment 1, since the alternating-current waveforms of the alternating lamp currents supplied to the respective high-pressure discharge lamps 12, 52 are so-called triangular waves, the alternating-current power supplied to the high-pressure discharge lamps 12, 52 becomes the maximum when the respective half periods end and the temperatures of the electrodes of the high-pressure discharge lamps 12, 52 rise to the higher values when the respective half periods end. Thereby, the discharge arc becomes stable and the flicker generation can be suppressed.

Embodiment 2

Figure 8:
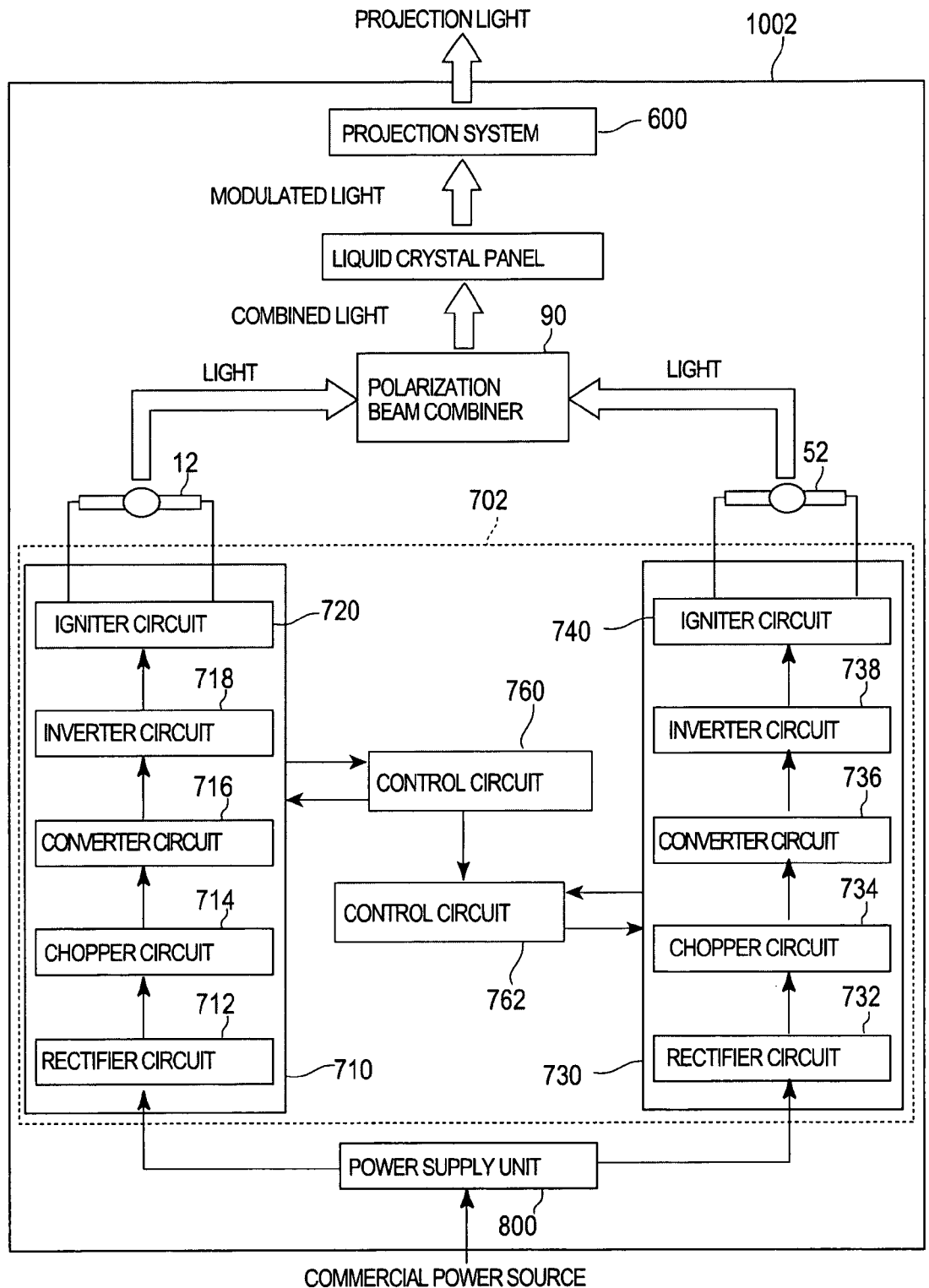
FIG. 8 is a block diagram for explanation of a circuit configuration of a high-pressure discharge lamp lighting device 702.

FIG. 8 shows a projector 1002 according to embodiment 2 for explanation and a block diagram for explanation of a circuit configuration of a high-pressure discharge lamp lighting device 702.

In FIG. 8, the same signs are assigned to the same members as those in FIG. 4 and the detailed description will be omitted.

The projector 1002 according to embodiment 2 basically has the same configuration as that of the projector 1000 of embodiment 1, but differs in the configuration of the high-pressure discharge lamp lighting device from the projector 1000 of embodiment 1.

That is, in the projector 1002 according to embodiment 2, as shown in FIG. 8, the high-pressure discharge lamp lighting device 702 has two control circuits 760, 762 in place of the control circuit 750 described in embodiment 1. The basic configuration of the control circuits 760, 762 is nearly the same as that of the control circuit 750 described in embodiment 1, and the detailed description will be omitted.

The control circuit 760 is provided correspondingly to the ballast 710 for the high-pressure discharge lamp 12, and controls the ballast 710 to supply the alternating lamp current having the alternating-current waveform described in embodiment 1 to the high-pressure discharge lamp 12.

The control circuit 762 is provided correspondingly to the ballast 730 for the high-pressure discharge lamp 52, and controls the ballast 730 to supply the alternating lamp current having the alternating-current waveform described in embodiment 1 to the high-pressure discharge lamp 52.

Further, the control circuit (one control circuit) 760 has a function of outputting control information on the ballast 710 to the control circuit (the other control circuit) 762. The control circuit 762 has a function of controlling the ballast 730 based on the control information from the control circuit 760.

As described above, the projector 1002 according to embodiment 2 differs in the configuration of the high-pressure discharge lamp lighting device from the projector 1000 of embodiment 1, but has the high-pressure discharge lamp lighting device 702 that supplies alternating lamp currents with alternating current waveforms having the same waveform and period and phases shifted by a predetermined amount with respect to each high-pressure discharge lamp, and therefore, the range of brightness variations in the illumination luminous flux output from the polarization beam combiner 90 can be made relatively narrow. As a result, the interference between brightness variations when the high-pressure discharge lamps 12, 52 are lighted using alternating current and brightness variations when the liquid crystal panel is driven can be suppressed, and consequently, the scroll noise generation on the projection screen can be suppressed.

Further, in the projector 1002 according to embodiment 2, of the two control circuits 760, 762 provided respectively correspondingly to the two ballasts 710, 730, the control circuit 760 has the function of outputting control information on the ballast 710 to the control circuit 762, and the control circuit 762 has the function of controlling the ballast 730 based on the control information from the control circuit 760, and thereby, according to the operation of the control circuits 760, 762, the alternating lamp currents having alternating-current waveforms with the same waveform and period and phases shifted by a predetermined amount with respect to each of the high-pressure discharge lamps can be supplied to the respective two high-pressure discharge lamps 12, 52. If the control circuit 760 is considered as a basic control circuit, the control circuit 762 controls the corresponding ballast 730 based on the control information of the basic control circuit, and the ballasts 710, 730 can be controlled with correct timing as is the case of embodiment 1.

Since the projector 1002 according to embodiment 2 has the same configuration as that of the projector 1000 according to embodiment 1 except the configuration of the high-pressure discharge lamp lighting device, the projector has the corresponding advantages of the advantages of the projector 1000 according to embodiment 1 as they are.

The projectors of the invention have been described based on the above respective embodiments, however, the invention is not limited to the respective embodiments but can be embodied in various embodiments without departing from the scope of the invention. For example, the following modifications can be made.

In the above respective embodiments, the case where the alternating-current waveforms of the alternating lamp currents supplied to the respective high-pressure discharge lamps are triangular waves as shown in FIG. 5A has been described as an example, however, the invention is not limited thereto.

Figure 9A:
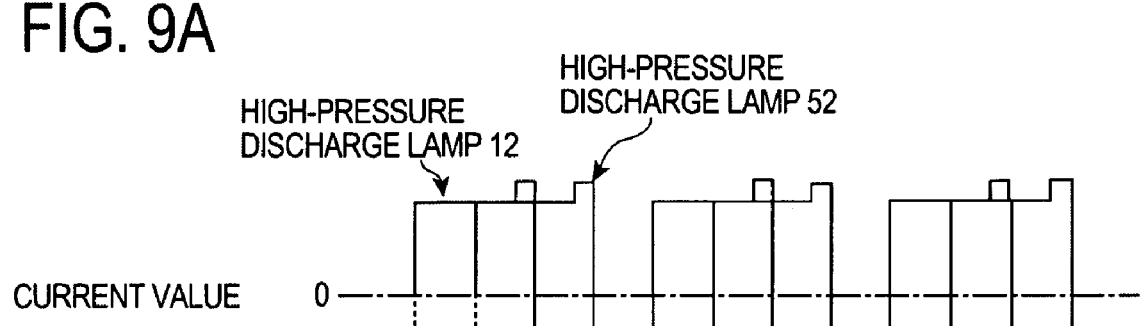
FIGS. 9A and 9B show a modified example of alternating-current waveforms.
Figure 9B:
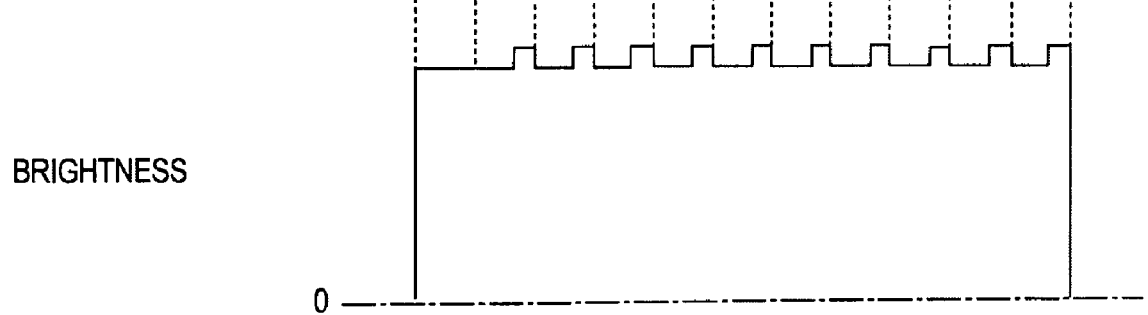

FIGS. 9A and 9B show a modified example of the alternating-current waveforms. FIG. 9A shows alternating current waveforms, and FIG. 9B shows brightness variations in illumination luminous flux output from the polarization beam combiner 90 when the alternating lamp currents shown in FIG. 9A are supplied to the respective high-pressure discharge lamps.

The alternating-current waveforms of the alternating lamp currents supplied to the respective high-pressure discharge lamps may be waveforms in which current pulses higher than the current value immediately before reversal of polarity are superimposed on the alternating lamp currents immediately before the reversal of polarity as shown in FIG. 9A. In this case, as is the case of the triangular waves, as known from FIG. 9B, the range of brightness variations in the illumination luminous flux output from the polarization beam combiner 90 can be made relatively narrow. As a result, the interference between brightness variations when the high-pressure discharge lamps 12, 52 are lighted using alternating current and brightness variations when the liquid crystal panel is driven can be suppressed, and consequently, the scroll noise generation on the projection screen can be suppressed.

In the above respective embodiments, the case where the two high-pressure discharge lamps are provided has been described as an example, however, the invention is not limited thereto, but three or more high-pressure discharge lamps may be provided. In this case, it is preferable that the amount of phase shift X of the alternating-current waveforms with respect to each high-pressure discharge lamp satisfies "$X = \frac{1}{2}n$" according to the number of high-pressure discharge lamps n.

In the above respective embodiments, the case where the secondary mirror as reflecting means is provided in the high-pressure discharge lamp has been described as an example, however, the invention is not limited thereto, but the invention can be applied to the case where no secondary mirror is provided, or the invention can be applied to the case where a reflection film is formed in the tube part.

In the above respective embodiments, the light source including the ellipsoidal reflector and the concave lens has been used as a light source, however, the invention is not limited thereto, but a light source including a paraboloidal reflector may preferably be used.

In the above respective embodiments, the polarization beam combiner 90 of cube type formed by bonding two triangular prisms has been used as a light combining system, however, the invention is not limited thereto, but a polarization beam combiner of plate type may preferably be used. Further, in the above respective embodiments, the polarization separation optical elements 20, 60 including prisms have been used as polarization separation optical elements, however, the invention is not limited thereto, but polarization separation optical elements of plate type may preferably be used. As the polarization beam combiner of plate type and the polarization separation optical element of plate type, elements formed by providing polarization separation films on light-transmissive substrates or the like may be appropriately used.

In the above respective embodiments, the polarization light source 40 outputs illumination luminous flux of P-polarized component, the polarization light source 80 outputs illumination luminous flux of S-polarized component, the polarization beam combiner 90 has the polarization combining surface 92 that transmits the illumination luminous flux of P-polarized component and reflects the illumination luminous flux of S-polarized component, however, the invention is not limited thereto, but the polarization light source 80 outputting illumination luminous flux of S-polarized component may be disposed in the position of the polarization light source 40, the polarization light source 40 outputting illumination luminous flux of P-polarized component may be disposed in the position of the polarization light source 80, and the polarization beam combiner may have a polarization combining surface that transmits the illumination luminous flux of S-polarized component and reflects the illumination luminous flux of P-polarized component.

In the above respective embodiments, the ½ plates 30, 70 are attached to predetermined positions on the light-incident surfaces 94, 96 of the polarization beam combiner 90, however, the invention is not limited thereto, but they may be attached to predetermined positions on the light-exit surfaces of the polarization separation optical elements 20, 60.

In the above respective embodiments, the case where the light-exit surfaces of the concave lenses 18, 58 and the light-incident surfaces of the polarization separation optical elements 20, 60, and the light-exit surfaces of the polarization separation optical elements 20, 60 and the light-incident surfaces 94, 96 of the polarization beam combiner 90 are spaced has been described as an example, however, the invention is not limited thereto, but these surfaces may be bonded via adhesives.

In the above respective embodiments, the case of using the polarization beam combiner as a light combining system has been described as an example, however, the invention is not limited thereto, but the invention can be applied to the configuration in which, for example, a triangular prism is used and the triangular prism is disposed between two light sources provided facing each other (about the triangular prism, see JP-A-2001-359025, for example).

In the above respective embodiments, the lens integrator system including lens arrays has been used as the light homogenization system, however, the invention is not limited thereto, but a rod integrator system including rod members may preferably be used.

In the above respective embodiments, the case where the invention is applied to the transmissive projector has been described as an example, however, the invention is not limited thereto, but may be applied to a reflective projector. Here, "transmissive" refers to the type in which the electro-optical modulation device as light modulating means transmits light like a transmissive liquid crystal device or the like, and "reflective" refers to the type in which the electro-optical modulation device as light modulating means reflects light like a reflective liquid crystal device or the like. When the invention is applied to a reflective projector, the same advantages as those of the transmissive projector may be obtained.

In the above respective embodiments, the projector using the three liquid crystal modulation units 400R, 400G, 400B has been described as an example, however, the invention is not limited thereto, but may be applied to a projector using one, two, four or more liquid crystal modulation units.

The invention may be applied to a front-projection projector that projects projection images from the observation side, or a rear-projection projector that projects projection images from the opposite side to the observation side.

What is claimed is:

1. A projector comprising:
   plural high-pressure discharge lamps;
   a high-pressure discharge lamp lighting device that lights the plural high-pressure discharge lamps;
   a light combining system that combines and outputs lights from the plural high-pressure discharge lamps;
   an electro-optical modulation device that modulates the light from the light combining system according to image information; and
   a projection system that projects the light modulated by the electro-optical modulation device,
   the high-pressure discharge lamp lighting device supplying alternating lamp currents having alternating-current waveforms with the same waveform and period and phases shifted by a predetermined amount with respect to each of the high-pressure discharge lamps to the respective plural high-pressure discharge lamps;
   the high-pressure discharge lamp lighting device having:
      plural ballasts respectively corresponding to the plural high-pressure discharge lamps; and
      a control circuit that integrally controls the plural ballasts to supply alternating lamp currents having the alternating-current waveforms to the respective plural high-pressure discharge lamps;
   the high-pressure discharge lamp lighting device being configured to detect rises of the alternating lamp currents and control the plural ballasts based on detection information on the rises of the alternating lamp currents.

2. The projector according to claim 1, given that the amount of phase shift is X (unit: period) and the number of the high-pressure discharge lamps is n (unit: number), is satisfied.

3. The projector according to claim 1, the high-pressure discharge lamp lighting device having:
   plural control circuits respectively corresponding to the plural ballasts and respectively integrally controls the ballasts to supply the alternating lamp currents having the alternating-current waveforms to the respective plural high-pressure discharge lamps,
   one control circuit of the plural control circuits being configured to output control information on the ballast controlled by the control circuit itself to the other control circuit, and
   the other control circuit being configured to control the corresponding ballast based on the control information from the one control circuit.

4. The projector according to claim 1, the alternating-current waveform being a waveform in which an instantaneous value of current gradually increases with time in a half period.

5. The projector according to claim 1, the alternating-current waveform being a waveform in which a current pulse is superimposed on the alternating lamp current immediately before the reversal of polarity so that a current value immediately before reversal of polarity is higher than a current value of the alternating-current.

6. A projector comprising:
   a plurality of high-pressure discharge lamps;
   a high-pressure discharge lamp lighting device that lights the plurality of high-pressure discharge lamps;
   a light combining system that combines and outputs lights from the plurality high-pressure discharge lamps;
   an electro-optical modulation device that modulates the light from the light combining system according to image information; and
   a projection system that projects the light modulated by the electro-optical modulation device,
   the high-pressure discharge lamp lighting device supplying alternating lamp currents to the respective plural high-pressure discharge lamps, the alternating lamp currents being triangular waves;

the high-pressure discharge lamp lighting device having:
  plural ballasts respectively corresponding to the plurality of high-pressure discharge lamps; and
  a control circuit that integrally controls the plural ballasts to supply the alternating lamp currents having alternating-current waveforms to respective high-pressure discharge lamps;
the high-pressure discharge lamp lighting device being configured to detect rises of the alternating lamp currents and control the plural ballasts based on detection information on the rises of the alternating lamp currents.

7. The projector according to claim 6, the alternating lamp currents having alternating-current waveforms with an amount of phase shift periods being equal to half the number of high-pressure discharge lamps.

* * * * *